(12) United States Patent
Goyal et al.

(10) Patent No.: US 8,964,662 B2
(45) Date of Patent: Feb. 24, 2015

(54) METHOD AND SYSTEM FOR MANAGING A BODY AREA NETWORK USING A COORDINATOR DEVICE

(75) Inventors: Giriraj Goyal, Bangalore (IN); Kiran Bynam, Bangalore (IN); Thenmozhi Arunan, Bangalore (IN); Eun-tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 498 days.

(21) Appl. No.: 13/318,284

(22) PCT Filed: Apr. 30, 2010

(86) PCT No.: PCT/KR2010/002780
§ 371 (c)(1),
(2), (4) Date: Oct. 31, 2011

(87) PCT Pub. No.: WO2010/126342
PCT Pub. Date: Nov. 4, 2010

(65) Prior Publication Data
US 2012/0051314 A1 Mar. 1, 2012

(30) Foreign Application Priority Data

Apr. 30, 2009 (IN) .......................... 1014/CHE/2009
Oct. 26, 2009 (IN) .......................... 2605/CHE/2008

(51) Int. Cl.
*H04W 4/00* (2009.01)
*H04L 9/32* (2006.01)
(Continued)

(52) U.S. Cl.
CPC ............ *H04L 9/3271* (2013.01); *H04L 9/0833* (2013.01); *H04L 9/0866* (2013.01);
(Continued)

(58) Field of Classification Search
CPC ....... H04L 9/0833; H04L 9/0866; H04L 9/14; H04L 9/3271; H04L 9/3236; H04L 2209/88; H04L 2209/80
See application file for complete search history.

(56) References Cited

U.S. PATENT DOCUMENTS

2003/0119568 A1 6/2003 Menard
2007/0255318 A1 11/2007 Dudding et al.
(Continued)

FOREIGN PATENT DOCUMENTS

RU 2007130141 3/2009

OTHER PUBLICATIONS

IEEE 15-09-0188-00-0006, Mar. 2009, IEEE.*
(Continued)

*Primary Examiner* — Jae Y Lee
(74) *Attorney, Agent, or Firm* — The Farrell Law Firm, P.C.

(57) ABSTRACT

A method and system for managing a body area network using a coordinator device. The method includes acquiring a medical implant communication service (MICS) channel by an MICS transceiver in the coordinator device. The method also includes sending a signal, indicative of a wake-up process, in a non-MICS channel to an implant device and a command signal, indicative of joining a piconet, by the MICS transceiver to an implant device. Further, the method also includes receiving an acknowledgement signal by the MICS transceiver of the coordinator device based on the sending of the command signal to the implant device. The acknowledgement signal comprises a security control field. Furthermore, the method includes initiating security procedures based on the security control field. Further, the method also includes exchanging data between the coordinator device and the implant device based on the initiating and disassociating the implant device by sending a command message.

40 Claims, 13 Drawing Sheets

(51) Int. Cl.
  *H04L 9/08* (2006.01)
  *H04L 9/14* (2006.01)
  *H04W 84/18* (2009.01)

(52) U.S. Cl.
  CPC .............. *H04L 9/14* (2013.01); *H04L 9/3236* (2013.01); *H04W 84/18* (2013.01); *H04L 2209/80* (2013.01); *H04L 2209/88* (2013.01)
  USPC .......................................... 370/329; 370/328

(56) References Cited

U.S. PATENT DOCUMENTS

| | | | |
|---|---|---|---|
| 2008/0009921 | A1 | 1/2008 | Mosesov et al. |
| 2008/0161659 | A1 | 7/2008 | Reichenberger et al. |
| 2010/0036463 | A1* | 2/2010 | Bange et al. .................. 607/60 |
| 2010/0151113 | A1* | 6/2010 | Shelton ........................ 427/2.24 |
| 2010/0202354 | A1* | 8/2010 | Ho ................................ 370/328 |
| 2012/0082036 | A1* | 4/2012 | Abedi et al. .................. 370/241 |

OTHER PUBLICATIONS

IEEE 802.15-09-0314-01-0006, May 2009, IEEE.*
PCT/ISA/237 Written Opinion issued on PCT/KR2010/002780 (pp. 4).
PCT/ISA/210 Search Report issued on PCT/KR2010/002780 (pp. 3).
Zhen, et al., Networking Issues in Medical Implant Communications, International Journal of Multimedia and Ubiquitous Engineering, vol. 4, No. 1, Jan. 2, 2009, Sections 2-3, 5.
Ullah, et al., On the Development of Low-power MAC Protocol for WBANs, International MultiConference of Engineers and Computer Scientists (IMECS), Mar. 1, 2009, Sections I, II, IV, V.
Takada, et al., Static Propagation and Channel Models in Body Area, COST 2100 TD (08)639, Oct. 6, 2008, Sections 2-4, 6.
Bugler, Communication Protocols for a Multi-Hoping Wireless Body Sensor Network, B.E. thesis, University of Newcastle, Australia, Oct. 28, 2008, Sections 3, 5, 8.
Maulin Patel, "Are MICS and MedRadio Service Bands Suitable for IEEE 802.15.6?", IEEE 802.15-08-0132-00-0006, IEEE Mentor, Mar. 17, 2008.
Kyungsup Kwak et al., "A Pattern-Based WBAN System with Bridging Mechanism", IEEE 802.15-09-0145-00-0006, IEEE Mentor, Mar. 10, 2009.
Yuce et al., "Implementation of Body Area Networks Based on MICS/WMTS Medical Bands for Healthcare Systems", 30th Annual International IEEE EMBS Conference, Aug. 20-24, 2008.
Peter D. Bradley, "An Ultra Low Power, High Performance Medical Implant Communication System (MICS) Transceiver for Implantable Devices", Nov. 29, 2006.
Huan-Bang Li et al., "IEEE 802.15.6 Regulation Subcommittee Report", IEEE 802.15 Wireless Personal Area Networks, IEEE P802.15-08-0034-10-0006, Sep. 11, 2008.

* cited by examiner

METHOD AND SYSTEM FOR MANAGING A BODY AREA NETWORK USING A COORDINATOR DEVICE

PRIORITY

This application is a National Phase Entry of PCT International Application No. PCT/KR2010/002780, which was filed on Apr. 30, 2010, and claims priority to Indian Patent Application No. 1014/CHE/2009, which was filed in the Indian Intellectual Property Office on Apr. 30, 2009, and Indian Patent Application No. 2605/CHE/2008, which was filed in the Indian Intellectual Property Office on Oct. 26, 2009, the contents of each of which is incorporated herein by reference.

TECHNICAL FIELD

The present disclosure relates generally to the field of medical implant communication systems. More particularly, the present disclosure relates to a method and system for managing a body area network comprising implant devices and on-body devices using a coordinator device.

BACKGROUND ART

Currently, a body area network (BAN) uses short range wireless medium to communicate between devices. A centralized node, referred to as a coordinator device, controls piconet communication. A set of BAN devices connected to the coordinator device forms a piconet. The BAN devices are used to cater to medical control systems, patient monitoring, health and fitness, gaming, multimedia applications. Some of the BAN devices are implanted in a living body, referred to as implant devices (IMDs) and the other BAN devices present on the living body are referred to as on-body devices (OBDs).

DISCLOSURE OF INVENTION

Technical Problem

The BAN devices are typically small and do not have a constant power supply connection. The BAN devices draw power from battery that cannot be recharged very often or not at all for few IMDs.

The IMDs being power constrained are in a deep sleep mode most often and require a wake-up process before starting communication, except in case of an emergency event where the IMD detects an emergency and wakes up. However, a data communication phase for the IMD is almost negligible for life of an IMD device life as it happens for a session of few seconds. Therefore, the wake-up and association process is major part of implant communication process. Further, communication with the IMD is restricted to medical implant communication systems whereas communication with OBDs can be performed using, but not limited to, ultra wide band or narrow band signal, thereby increasing complexity in operation of the coordinator device.

In light of the foregoing discussion there is a need for a method and system for managing a body area network comprising implant devices and on-body devices using a coordinator device.

Solution to Problem

Embodiments of the present disclosure described herein provide a method and system for managing a body area network comprising implant devices and on-body devices using a coordinator device.

An example of a method for managing a plurality of implant devices in a body area network by using a coordinator device includes acquiring a medical implant communication service (MICS) channel by an MICS transceiver in the coordinator device. The method also includes sending a signal, indicative of a wake-up process, in a non-MICS channel to an implant device. Further, the method includes sending a command signal, indicative of joining a piconet, by the MICS transceiver to an implant device. The command signal comprises a device identifier. Further, the method also includes receiving an acknowledgement signal by the MICS transceiver of the coordinator device based on the sending of the command signal to the implant device. The acknowledgement signal comprises a security control field. Furthermore, the method includes initiating security procedures based on the security control field comprising authenticating the implant device, performing one of encryption and decryption based on the authenticating, implementing replay protection and enabling integrity protection for data frames. Further, the method also includes exchanging data between the coordinator device and the implant device based on the initiating and disassociating the implant device by sending a command message, wherein the command message comprises one of a unicast message, a multicast message and a broadcast message.

An example of a method for managing a plurality of on-body devices in a body area network by using a coordinator device includes acquiring a communication channel by a transceiver in the coordinator device. The method also includes receiving a request for coordinator device information from an on-body device. Further, the method includes receiving an association request for joining a piconet from the on-body device. The association request comprises one or more parameters. Further, the method includes determining the association request based on a plurality of admission control parameters defined for the coordinator device. Further, the method also includes acknowledging the association request with a message signal based on the determining, wherein the message signal comprises one of an accept message signal including an device identifier for the on-body device in the piconet and a reject message signal including a reason for refusing the association request. Furthermore, the method includes initiating security procedures based on a security control field comprising one of authenticating the on-body device, performing one of encryption and decryption based on the authenticating and enabling integrity protection for data frames. Further, the method also includes exchanging data between the coordinator device and the on-body device based on the initiating. Further, the method includes disassociating the on-body device by sending a command message, wherein the command message comprises one of a unicast message, a multicast message and a broadcast message.

An example of a system includes a body area network. The body area network includes a plurality of implant devices, a plurality of on-body devices, a coordinator device in communication with the plurality of implant devices. The coordinator device includes a communication interface for exchanging signals and data between the coordinator device and the plurality of implant devices. The coordinator device also includes a processor in electronic communication with the communication interface to acquire a medical implant communication service (MICS) channel by an MICS transceiver in the coordinator device. The processor also sends a signal, indicative of a wake-up process, in a non-MICS channel to an implant device. Further, the processor sends a command signal, indicative of joining a piconet, by the MICS transceiver to an implant device The command signal comprises a device identifier. Further, the processor also receives an acknowledgement signal by the MICS transceiver of the coordinator device based on the sending of the command signal to the implant device. The acknowledgement signal comprises a security control field. Furthermore, the processor initiates security procedures based on the security control field that includes authenticate the implant device, perform one of encryption and decryption based on the authenticating, implement replay protection and enable integrity protection for data frames. The processor also exchanges data between the coordinator device and the implant device based on the initiating. Further, the processor disassociates the implant device by sending a command message. The command message includes one of a unicast message, a multicast message and a broadcast message. The coordinator device in communication with the plurality of on-body devices includes the communication interface for exchanging signals and data between the coordinator device and the plurality of on-body devices. The coordinator device also includes the processor in electronic communication with the communication interface to acquire a communication channel by a transceiver in the coordinator device. The processor also receives a request for coordinator device information from an on-body device. Further, the processor receives an association request for joining a piconet from the on-body device. The association request comprises one or more parameters. Further, the processor also determines the association request based on a plurality of admission control parameters defined for the coordinator device. Furthermore, the processor acknowledges the association request with a message signal based on the determining. The message signal includes one of an accept message signal including an device identifier for the on-body device in the piconet, and a reject message signal including a reason for refusing the association request. Furthermore, the processor also initiates security procedures based on a security control field that authenticates the on-body device, performs one of encryption and decryption based on the authenticating, implements replay protection and enables integrity protection for data frames. The processor also exchanges data between the coordinator device and the on-body device based on the initiating. Further, the processor disassociates the on-body device by sending a command message, wherein the command message comprises one of a unicast message, a multicast message and a broadcast message.

Advantageous Effects of Invention

The present invention can provide a method and system for managing a body area network comprising implant devices and on-body devices using a coordinator device

MODE FOR THE INVENTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for managing a body area network comprising implant devices and on-body devices using a coordinator device.

Figure 1:
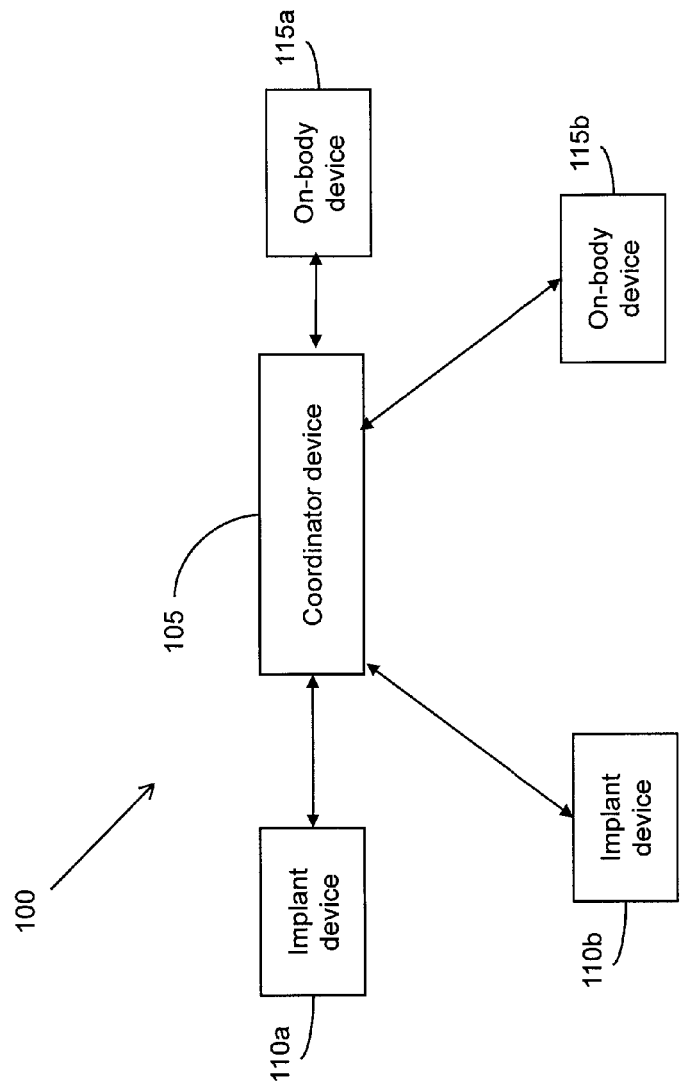
FIG. 1 is a block diagram of an environment, in accordance with which various embodiments can be implemented.

FIG. 1 is a block diagram of an environment 100, in accordance with which various embodiments can be implemented. The environment can be a body area network (BAN).

The environment 100 includes a coordinator device 105 and a plurality of implant devices (IMDs), for example an implant device 110a and an implant device 110b. The environment 100 also includes a plurality of on-body devices (OBDs), for example an on-body device 115a and an on-body device 115b. The coordinator device 105 is in electronic communication with the IMDs and the OBDs. Examples of the coordinator device 105 include, but are not limited to, a computer, a laptop, a mobile device, a handheld device, a personal digital assistant (PDA), and any electronic equipment used in medical applications. The IMDs are electronic devices implanted inside a living body. The OBDs are devices that are placed on or in close proximity of a living body. The coordinator device 105 is a device on or in close proximity of the living body that controls a channel and provides network access to one or more IMDs and the OBDs.

The IMDs and the OBDs are used for communicating data to the coordinator device 105. For example, a body area network (BAN) including the electronic devices in communication with the coordinator device 105.

Multiple communication channels exist between the coordinator device 105 and the IMDs and the OBDs, and communication of the data can take place using any one of the communication channels. In one embodiment, the IMD 110a is in a sleep state and the coordinator device 105 sends a wake-up signal to the IMD 110a for communication of data. In another embodiment, the coordinator device 105 receives a request from the OBD 115a for communication of the data.

The coordinator device 105 includes one or more elements for identifying an emergency signal. The coordinator device 105 including the elements is explained in detail in FIG. 2.

Figure 2:
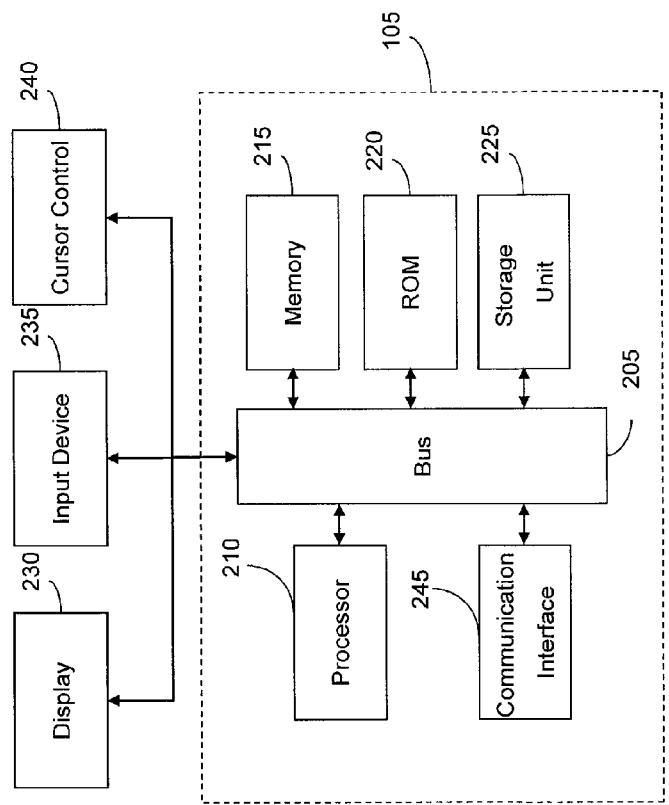
FIG. 2 is a block diagram of a coordinator device, in accordance with one embodiment.

FIG. 2 is a block diagram of the coordinator device 105, in accordance with one embodiment. The coordinator device 105 includes a bus 205 for communicating information, and a processor 210 coupled to the bus 205 for processing the information. The coordinator device 105 also includes a memory 215, for example a random access memory (RAM) coupled to the bus 205 for storing information required by the processor 210. The memory 215 can be used for storing temporary information required by the processor 210. The coordinator device 105 can further include a read only memory (ROM) 220 coupled to the bus 205 for storing static information required by the processor 210. A storage unit 225, for example a magnetic disk, a hard disk or an optical disk, can be provided and coupled to the bus 205 for storing the information.

The coordinator device 105 can be coupled via the bus 205 to a display 230, for example a cathode ray tube (CRT) or liquid crystal display (LCD), for displaying information. An input device 235, including various keys, is coupled to the bus 205 for communicating information to the processor 210. A cursor control 240, for example a mouse, a trackball, a joystick, or cursor direction keys, used for communicating information to the processor 210 and for controlling cursor movement on the display 230 can also be coupled to the coordinator device 105.

In some embodiments, the steps of the present disclosure are performed by the coordinator device 105 using the processor 210. The information can be read into the memory 215 from a machine-readable medium, for example the storage unit 225. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The storage unit 225 can be a non-volatile media. The memory 215 can be a volatile media. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

The coordinator device 105 also includes a communication interface 245 coupled to the bus 205 for enabling signal and data communication. Examples of the communication interface 245 include, but are not limited to, a zigbee port, or any wireless port specified by Institute of Electrical and Electronics Engineers (IEEE) 802.15.6 task group. The communication interface 245 is in electronic communication with the IMDs and the OBDs. Multiple communication channels can be associated with the communication interface 245.

In some embodiments, the processor 210 can include one or more processing units for performing one or more functions of the processor 210. The processing units are hardware circuitry performing specified functions.

The one or more functions include acquiring a medical implant communication service (MICS) channel by an MICS transceiver in the coordinator device 105. The functions also includes sending a signal, indicative of a wake-up process, in a non-MICS channel to an implant device, for example the IMD 110a. Further, the method includes sending a command signal, indicative of joining a piconet, by the MICS transceiver to an implant device. The command signal comprises a device identifier. Further, the functions also include receiving an acknowledgement signal by the MICS transceiver of the coordinator device 105 based on the sending of the command signal to the implant device. The acknowledgement signal comprises a security control field. Furthermore, the functions include initiating security procedures based on the security control field comprising authenticating the IMD 110a, performing one of encryption and decryption based on the authenticating, implementing replay protection and enabling integrity protection for data frames. Further, the functions also include exchanging data between the coordinator device 105 and the IMD 110a based on the initiating and disassociating the IMD 110a by sending a command message. The command message comprises one of a unicast message, a multicast message and a broadcast message.

For the communication with the OBDs, the functions of the processor 210 include acquiring a communication channel by a transceiver in the coordinator device 105. The function also includes receiving a request for coordinator device information from an on-body device, for example the OBD 115a. Further, the functions include receiving an association request for joining a piconet from the on-body device. The association request includes one or more parameters. Further, the functions also include determining the association request based on a plurality of admission control parameters defined for the coordinator device 105. The functions include acknowledging the association request with a message signal based on the determining. The message signal comprises one of an accept message signal including an device identifier for the OBD 115a in the piconet and a reject message signal including a reason for refusing the association request. The functions include initiating security procedures based on a security control field comprising one of authenticating the OBD 115a, performing one of encryption and decryption based on the authenticating and enabling integrity protection for data frames. Further, the functions also include exchanging data between the coordinator device 105 and the OBD 115a based on the initiating. Further, the functions include disassociating the OBD 115a by sending a command message. The command message comprises one of a unicast message, a multicast message and a broadcast message.

It is noted that each IMD, for example the IMD 110a, and each OBD, for example the OBD 115a, can be structurally similar to the coordinator device 105 and include various elements as shown for the coordinator device 105. The functionalities of each element of the coordinator device 105 in FIG. 2 can be similar to the IMD 110a and the OBD 115a except for the processor 210.

Figure 3:
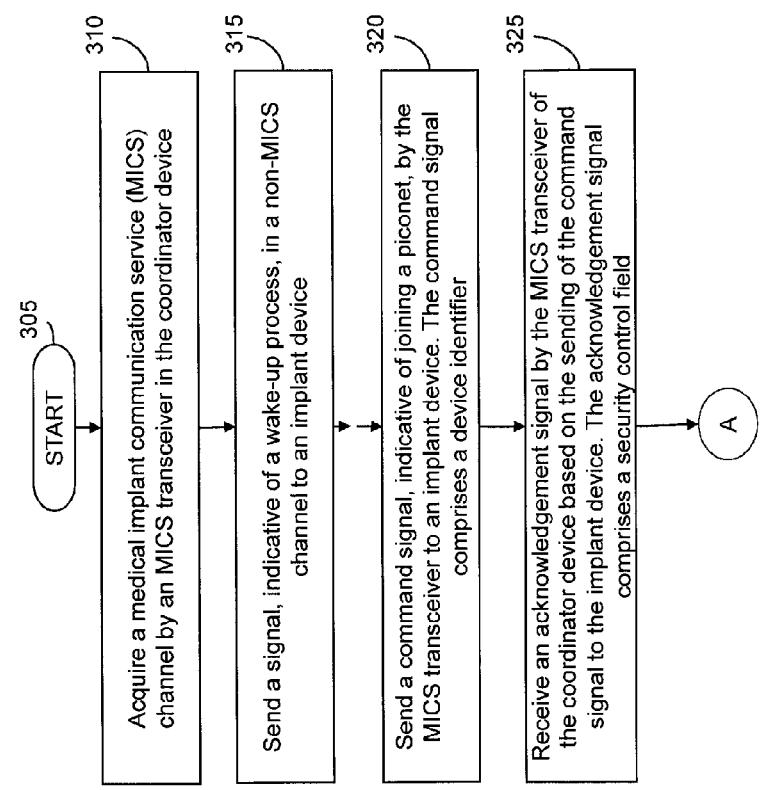
FIG. 3 and FIG. 4 is a flowchart illustrating a method for managing a plurality of implant devices in a body area network by using a coordinator device, in accordance with one embodiment.
Figure 4:
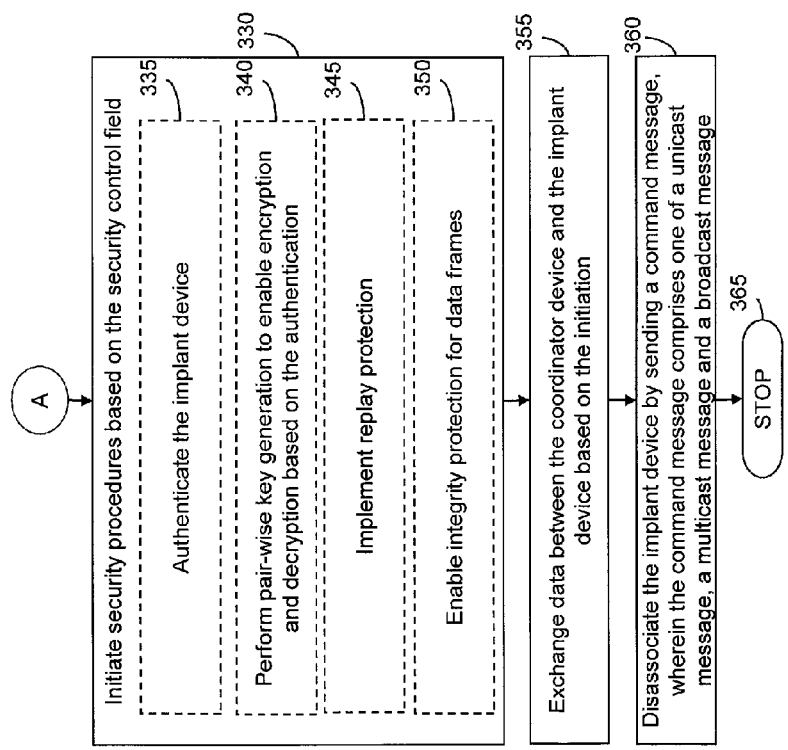

FIGS. 3-4 is a flowchart illustrating a method for managing a plurality of implant devices (IMDs) in a body area network by using a coordinator device, for example the coordinator device 105.

In one embodiment, an IMD, for example the IMD 110a, is in a deep sleep mode. The deep sleep mode can be defined as the IMD being in a powered on but non-operating state. In the deep sleep mode, an energy detector of a non-MICS receiver will be active in a duty cycled mode. The IMD will become operational in an event of an emergency condition or when a wake-up process is initiated by the coordinator device.

The method starts at step 305.

At step 310, a medical implant communication service (MICS) channel is acquired by an MICS transceiver in the coordinator device. The MICS channel initially senses the MICS channel for a predefined duration. If the MICS channel is determined to be free of any interference then the MICS channel is acquired for communication by the coordinator device.

Further, after acquiring the MICS channel, if a period of inactivity on the acquired MICS channel equals or exceeds a predefined duration of time, the coordinator device can hold the MICS channel by sending packets, for example, a null packet.

At step 315, a signal, indicative of a wake-up process, is sent in a non-MICS channel to the IMD. The signal is sent by the coordinator device to initiate the wake-up process at the IMD. The signal is sent by the coordinator device using a non-MICS transmitter, for example a 2.4 GHz transmitter. The signal includes information associated with the MICS channel.

In an embodiment, a non-MICS band is divided into N channels of equal bandwidth, equidistantly located. Both the IMD and the coordinator device avoid channels with high interferences. However, the level of interference can be different for both the IMD and the coordinator device. For example, manageable interference level for the coordinator device can be set lower than at the IMD.

If no interference is detected on a channel of the non-MICS band then the coordinator device sends the signal to the IMD indicating initiation of the wake-up process using carrier sense multiple access and collision avoidance technique. The signal is sent on the non-MICS channels within the manageable interference level. In some embodiments, the signal can be resent on each non-MICS channel within the manageable interference level for achieving better reliability. In some embodiments, the signal is sent on the non-MICS channels within the manageable interference level in a random sequence until an acknowledgement is received by the coordinator device.

During the deep sleep mode, the IMD duty cycles on the energy detector in a non-MICS channel having lesser interference. Upon receiving the signal, the IMD can send an acknowledgement signal.

In some embodiments, an acknowledgement signal is received by the MICS transceiver of the coordinator device based on the sending of the signal to the IMD.

In some embodiments, the signal is resent on the non-MICS channel until the acknowledgement signal is received from the implant device within a defined period of time. In some embodiments, the signal is resent on another non-MICS channel if no acknowledgement signal is received on the MICS channel with a defined period of time.

At step 320, a command signal, indicative of joining a piconet, is sent by the MICS transceiver to an implant device. The command signal includes a device identifier for the IMD assigned by the coordinator device.

In one embodiment, the command signal is sent after receiving the acknowledgement signal that was sent in response to the sending of the signal to the implant device.

At step 325, the acknowledgement signal is received by the MICS transceiver of the coordinator device based on the command signal sent to the implant device. The acknowledgement signal includes a security control field that defines security requirement at the IMD.

In some embodiments, the IMD waits till the signal and the command signal is received before transmitting the acknowledgement signal with the security control field.

At step 330, security procedures are initiated based on the security control field.

Security level is represented in the security control field using one byte bitmap. Each bit is used to indicate the support of security features as follows:

Bit 0—Authentication
Bit 1—Integrity protection
Bit 2—Encryption and decryption
Bit 3—Replay protection using frame counters
Bit 4—Same security for all frames in one session
Bit 5—Key size 192 bits
Bit 6—Key size 256 bits
Bit 7—Reserved for future use (RFU)

When no security is needed, the bits in the security control field are set to 0. The default key size used can be set as 128 bit keys. Different levels of security can be implemented for various devices using the one byte bitmap. The coordinator device can fail association, if the security level indicated by the IMD is not acceptable. The security control field defines a frame level security in the MAC frame using security control, application parameters fields exchanged during the association procedure, where different security features can be selected for each frame according to application and BAN device requirements. In some embodiments, the frame level security is identified during an association procedure that similar frame level security is uniformly used for the frames that need security protection.

Some capabilities are implemented in the coordinator device and the IMD for implementation of the security level.

The coordinator device can be preconfigured with following details:

A minimum security mode that the coordinator device expects the IMD to support.

A security table is stored in non-volatile memory of the coordinator device including the following fields:

Shared keys for each client device (multiple keys identified by an identifier, called Master Key ID (MKID)). The client device in this case can be the IMD.

Device ID, MAC address, type of device, service provided by clients. Such information could be pre-stored or gathered by an association procedure. This information is retained in the client device even after the client device disassociates from the coordinator device.

A BAN device can also be preconfigured with security keys and the corresponding MKID as in the coordinator device. Device ID, MAC address, type of device, service provided by the client device are preconfigured in the client device.

The IMD and the coordinator device should have the capability to store temporal keys and frame counters until the keys are renegotiated in a later session.

At step 335, the IMD is authenticated using a four way handshake procedure that validates that a master key is shared between the coordinator device and the IMD.

At step 340, pair-wise key generation to enable encryption and decryption is performed based on the authentication. For example, AES-128 counter mode can be used for data encryption.

At step 345, the replay protection is implemented.

A frame counter is used for the replay protection. A two byte frame counter can be used. The value of the frame counter from a previous session needs to be saved at the coordinator device and the IMD. A subsequent session can choose to continue counting from the frame counter stored from the previous session or restart with a new random frame counter.

At step 350, the integrity protection for the data frames is enabled.

AES-128 cipher block chaining-message authentication code (CBC-MAC) can be used for integrity check calculation. The integrity check can be included in the data frames.

A MAC protocol can selectively use privacy and the integrity protection used in the data frames that are sent from the IMD and the coordinator device. A security header field is used to indicate this selection. Standard frames, for example poll or other control frames, sent from the coordinator device need not be encrypted or integrity protected.

At step 355, data is exchanged between the coordinator device and the IMD based on the initiation at step 330. The data exchange can be performed based on the security procedure defined in step 330.

When the coordinator device is in communication with a plurality of IMDs, the data can be broadcasted by the coordinator device or sent individually to each IMDs. On receiving the data, each IMD sends a response to the coordinator device. Examples of the data can include, but are not limited to the command signal, data frames, a poll message, a data request, a control signal and a actuating signal. For example, when IMD receives a data frame from the coordinator device, the IMD sends a data acknowledgement signal to the coordinator device. In some embodiments, no response is sent by the IMD on receiving the data from the coordinator device.

At step 360, the implant device is disassociated by sending a command message. The command message includes one of a unicast message, a multicast message and a broadcast message. The disassociation can be performed by sending the command message to the IMD and releasing the device identifier.

In an embodiment, the coordinator device can disassociate multiple IMDs by broadcasting or multicasting the end session message to the IMDs.

In some embodiments, the IMD can disassociate from the coordinator device.

The method stops at step 365.

In some embodiments, the coordinator device can include another MICS transceiver or MICS receiver for receiving emergency signals from the IMD having an emergency event. The another MICS transceiver or MICS receiver can be duty cycling on the MICS channel having lesser interference for listening to emergency signals. The receiver frequency in the non-MICS channel is shifted to another frequency having lesser interference compared to the receiver frequency if plurality of signals received are non-body area network signals. An emergency signal can be identified using a payload header in received emergency signal.

In an embodiment, upon receiving the emergency signal at the another MICS transceiver, the coordinator device stops ongoing communication with the IMD, and the MICS transceiver starts communicating with the another implant device to handle the emergency.

In another embodiment, upon receiving the emergency signal at the another MICS transceiver, the coordinator device handles the emergency without stopping normal communication.

In one embodiment, a coordinator device is in communication with a first IMD. The coordinator device is required to connect to a second IMD. In such a case, the coordinator device sends a hold command to the first IMD. Upon receiving the hold command, the first IMD goes into sleep mode or switches off. The first IMD may be initialized to activate after a predefined time or periodically over predefined duration of time. The coordinator device then initiates connection with the second IMD based on the method described in FIG. 3 and FIG. 4. Upon establishing connection with the second IMD, the coordinator device sends an unhold command to the first IMD. In an embodiment, the first IMD activates after completion of the predefined time.

In second embodiment, the coordinator device is in communication with the first IMD in a MICS channel. The coordinator device is required to connect to the second IMD. The coordinator device sends a wake-up signal to the second IMD in a non-MICS channel. Upon receiving the wake-up signal, the second IMD will send the acknowledgement signal in the MICS channel using the carrier sense multiple access collision avoidance technique. When the coordinator device receives the acknowledgement signal, the coordinator device initiates connection with the second IMD based on the method described in FIG. 3 and FIG. 4.

Figure 5:
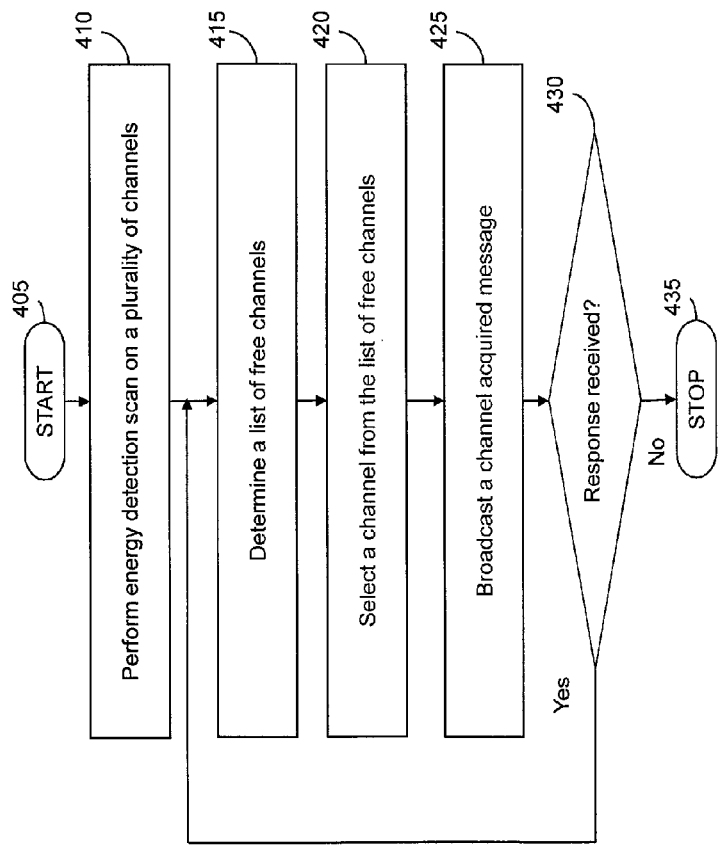
FIG. 5 is a flowchart illustrating a method for channel acquisition by a coordinator device in a body area network, in accordance with one embodiment.

FIG. 5 is a flowchart illustrating a method for channel acquisition by a coordinator device in a body area network, in accordance with one embodiment.

The method starts at step 405.

At step 410, an energy detection scan is performed on a plurality of channels. Each channel is sensed for a pre-determined time duration to detect the energy.

At step 415, a list of free channels is determined. The list of free channels can be determined by identifying the channels with low interferences.

In an embodiment, if no free channel is determined, then the method for channel acquisition is stopped.

At step 420, a channel having the least interference is selected from the list of free channels.

At step 425, a channel acquired message is broadcasted to determine if the channel is being utilized by another coordinator device in the BAN.

At step 430, it is determined if any response is received for the broadcasted message. If no response is received, then step 435 is performed.

If a response is received, which indicates that the selected channel is being utilized by the another coordinator device, then step 415 is performed.

The method stops at step 435.

Figure 6:
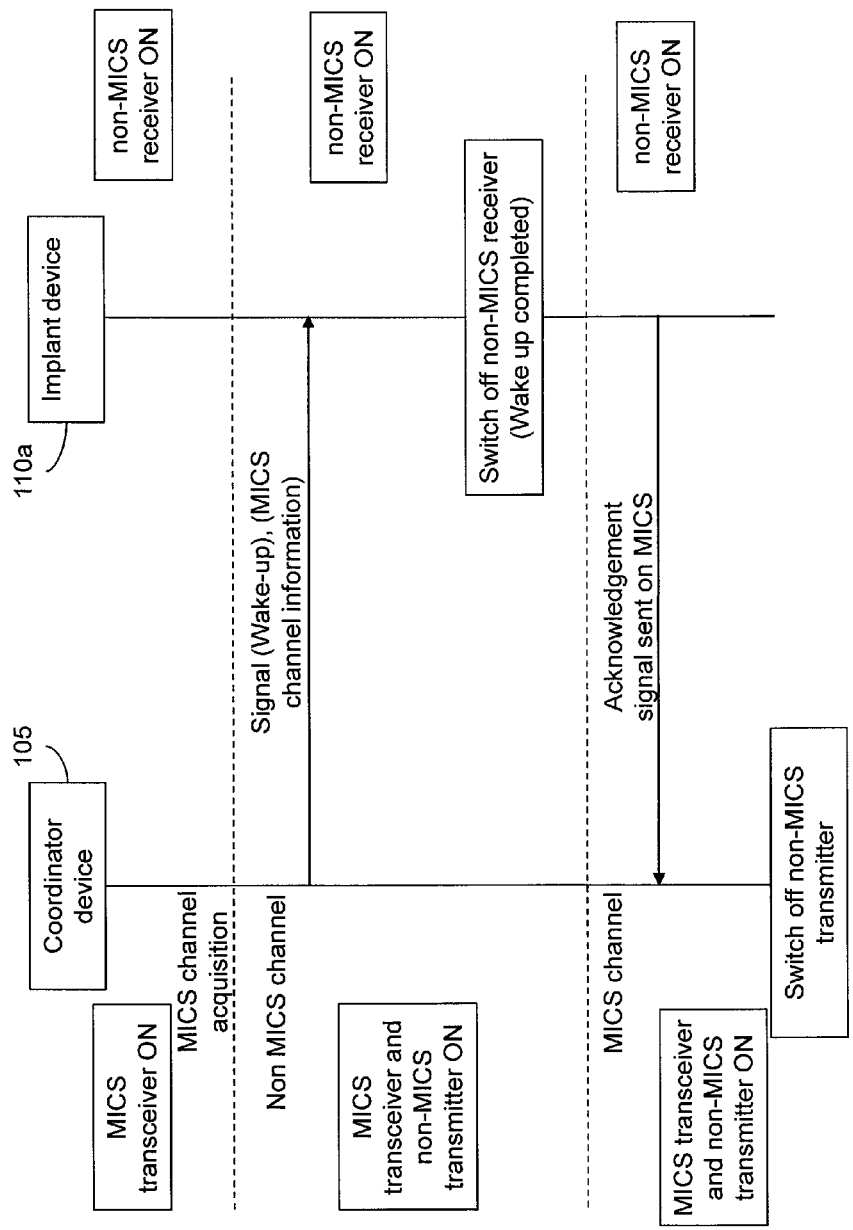
FIG. 6 is a flow diagram illustrating a wake-up process, in accordance with one embodiment.

FIG. 6 is a flow diagram illustrating a wake-up process, in accordance with one embodiment.

The flow diagram illustrates the wake-up process when polling is not used in the MICS channel for communication between a coordinator device, for example the coordinator device 105 and an IMD, for example the IMD 110a, that is currently in a deep sleep mode.

Initially, an MICS transceiver is switched on at the coordinator device 105 to perform MICS channel acquisition. Also, at the IMD 110a, a non-MICS receiver is switched on to listen to a wake-up signal.

Upon acquiring the MICS channel, a non MICS transmitter is switched on by the coordinator device 105 and a wake-up signal including the MICS channel information is sent to the IMD. The non-MICS receiver at the IMD 110a receives the wake-up signal and indicates to the IMD. The IMD 110a then switches off the non-MICS receiver and switches on the IMD's MICS transceiver for sending the acknowledgement signal to the coordinator device 105 indicating the wake-up process is completed. The coordinator device 105, on receiving the acknowledgement signal, switches off the non-MICS transmitter.

Figure 7:
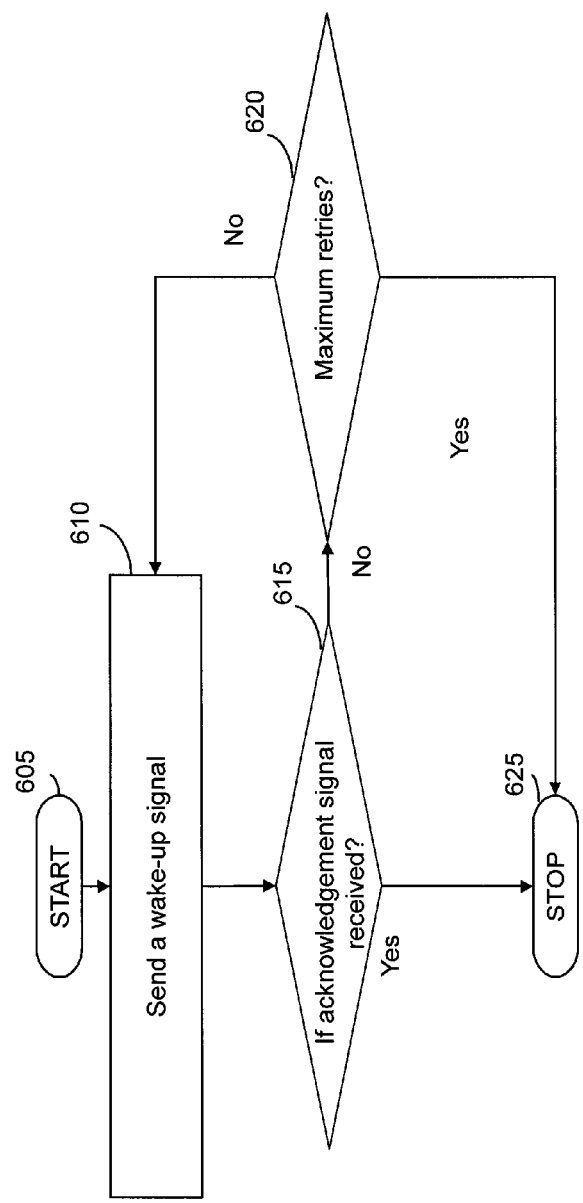
FIG. 7 is a flowchart illustrating a wake up process at a coordinator device, in accordance with one embodiment.

FIG. 7 is a flowchart illustrating a wake-up process at a coordinator device, for example the coordinator device 105, in accordance with one embodiment;

The method starts at step 605.

At step 610, a wake-up signal is sent by the coordinator device to an IMD. The coordinator device waits for a period of time to receive an acknowledgement signal.

At step 615, it is determined if the acknowledgement signal has been received.

If the acknowledgement signal is not received, then step 620 is performed else step 625 is performed.

At step 620, it is determined if maximum retries of sending wake up signal is performed.

If maximum retries is performed, then step 625 is performed else step 610 is performed.

In an embodiment, if the maximum retries is performed, then method of FIG. 7 is performed using another MICS channel.

The method stops at step 625.

Figure 8:
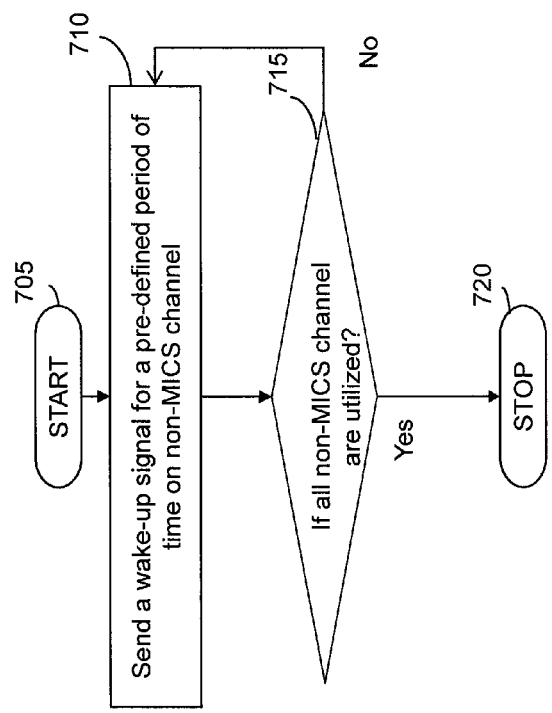
FIG. 8 is a flow chart illustrating another wake up process at a coordinator device in accordance with an embodiment.

FIG. 8 is a flowchart illustrating another wake-up process at a coordinator device, for example the coordinator device 105, in accordance with one embodiment.

The method starts at step 705.

At step 710, a wake-up signal is being sent by the coordinator device to an IMD for a predefined period of time. During the predefined period of time, the wake-up signal is continuously sent N times to the IMD on a non-MICS channel.

At step 715, it is determined if the wake-up signal is sent on all non-MICS channel.

If all non-MICS channels are utilized then step 720 is performed else step 710 is performed for another MICS channel.

The method stops at step 720.

Figure 9:
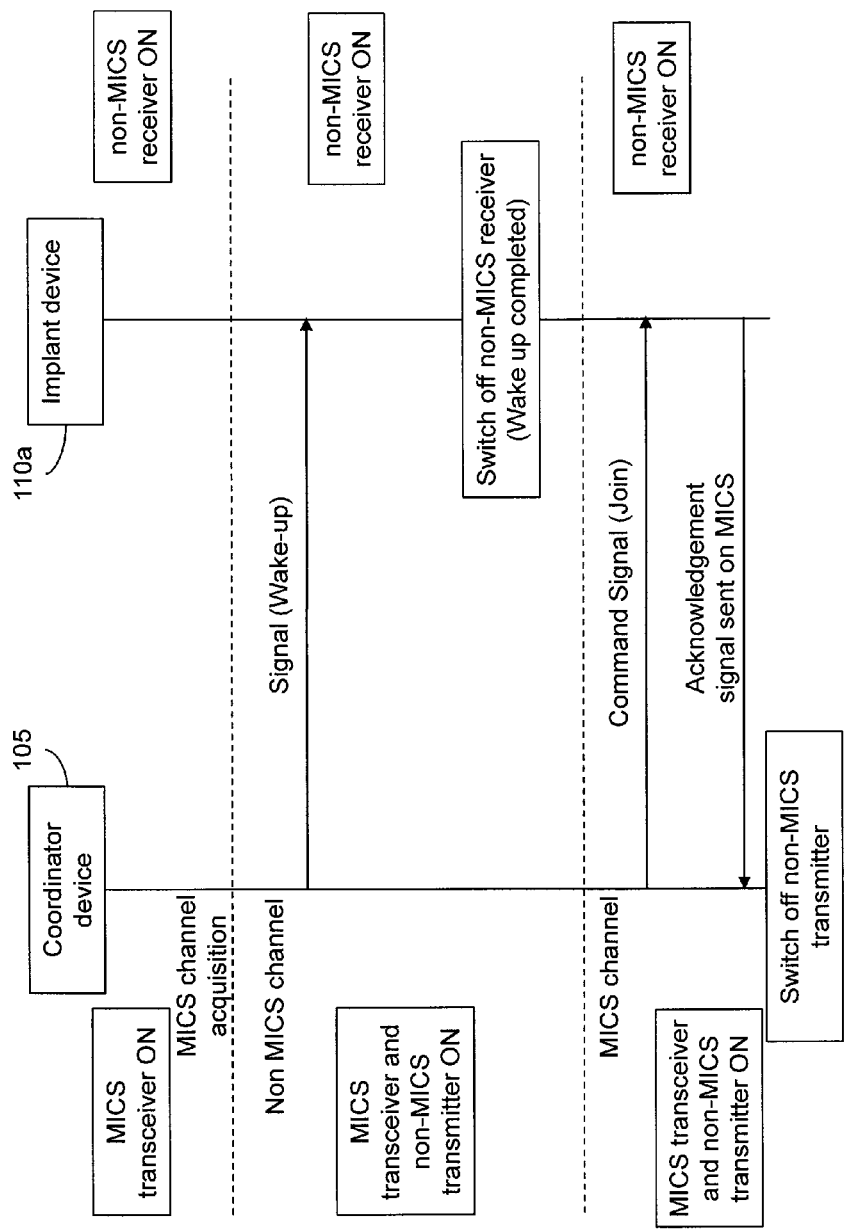
FIG. 9 is a flow diagram illustrating a wake-up process, in accordance with another embodiment.

FIG. 9 is a flow diagram illustrating a wake-up process, in accordance with another embodiment.

The flow diagram illustrates a wake-up process when polling is used in the MICS channel for communication between a coordinator device 105 and an IMD 110a that is in a deep sleep mode.

Initially, an MICS transceiver is switched on at the coordinator device 105 to perform MICS channel acquisition. Also, at the IMD 110a, a non-MICS receiver is switched on to listen to a wake-up signal.

Upon acquiring the MICS channel, a non-MICS transmitter is switched on by the coordinator device 105 and a wake up signal is sent to the IMD. The non-MICS receiver at the IMD 110a receives the wake-up signal and indicates to the IMD. The IMD 110a then switches off the non-MICS receiver and waits for a command signal indicative of joining the piconet. Upon receiving the command signal, the IMD 110a switches on the IMD's MICS transceiver for sending the acknowledgement signal to the coordinator device 105. The coordinator device 105, on receiving the acknowledgement signal, switches off the non-MICS transmitter and the wake-up process is completed.

Figure 10:
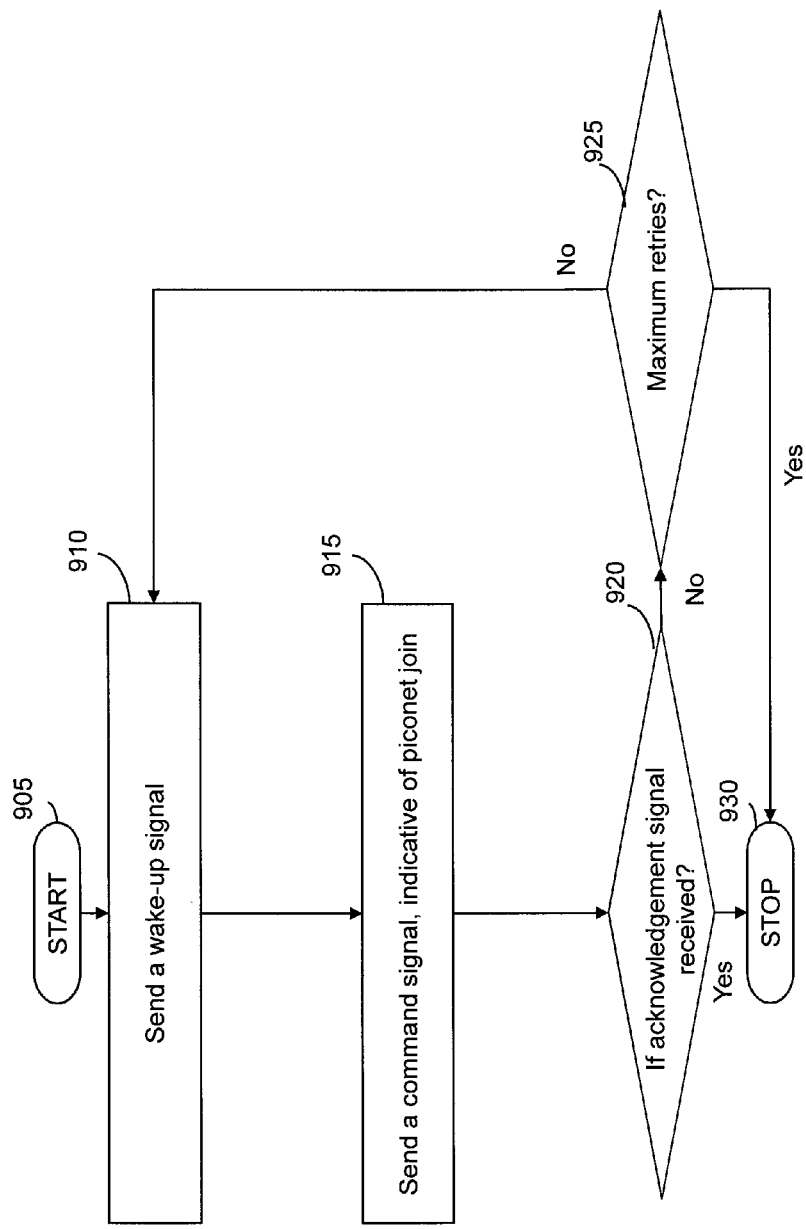
FIG. 10 is a flow chart illustrating a wake-up process at a coordinator device, in accordance with another embodiment.

FIG. 10 is a flowchart illustrating a wake-up process at a coordinator device, for example the coordinator device 105, in accordance with another embodiment.

The method starts at step 905.

At step 910, a wake-up signal is sent by the coordinator device to an IMD.

At step 915, a command signal, indicative of piconet join, is sent to the IMD after a predefined period of time of sending the wake-up signal. The coordinator device waits for another period of time to receive an acknowledgement signal.

At step 920, it is determined if the acknowledgement signal has been received.

If the acknowledgement signal is not received, then step 925 is performed else step 930 is performed.

At step 925, it is determined if maximum retries of sending the wake-up signal is performed.

If maximum retries is performed, then step 930 is performed else step 910 is performed.

The method stops at step 930.

Figure 11:
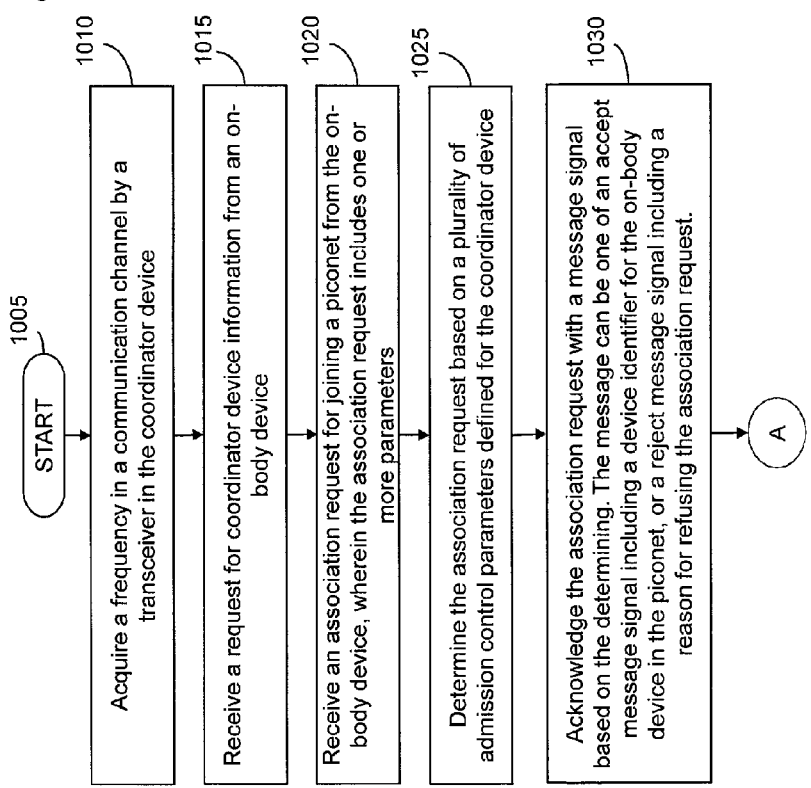
FIG. 11 and FIG. 12 is a flowchart illustrating a method for managing of a plurality of on-body devices in a body area network by using a coordinator device, in accordance with one embodiment.
Figure 12:
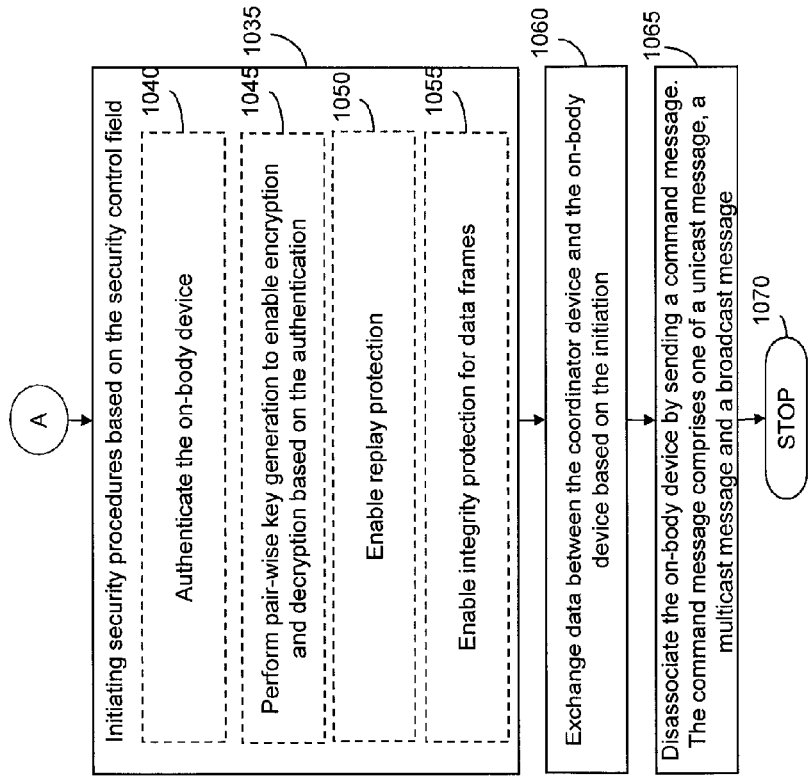

FIGS. 11-12 is a flowchart illustrating a method for managing a plurality of on-body devices in a body area network by using a coordinator device, for example the coordinator device 105.

An on-body device, for example the on-body device (OBD) 115a, performs a discovery for the coordinator device that has capability for handling the on-body device.

In one embodiment, the coordinator device can broadcast the capability in the body area network. In another embodiment, the on-body device can send an information request to the coordinator device.

The method starts at step 1005.

At step 1010, a frequency in a communication channel is acquired by a transceiver in the coordinator device.

The frequency can be acquired by initially sensing the frequency of the communication channel for a predefined duration. If the frequency in the communication channel is determined to be free of any interference then the coordinator device makes a channel announcement for acquiring the communication channel. If no response is received for the channel announcement, the communication channel is acquired.

At step 1015, a request for coordinator device information is received from the OBD.

The request includes capability of the coordinator device and an identifier for the coordinator device.

The coordinator device can then send its capability and the identifier.

In an embodiment, the coordinator device information can be broadcasted by the coordinator device.

At step 1020, an association request for joining a piconet is received from the OBD.

The association request includes one or more parameters, for example on-body device information, average data rate, packet size, inter packet arrival time, size of the packet sent at MAC layer, delay requirement, and the security control field.

At step 1025, the association request is determined based on a plurality of admission control parameters defined for the coordinator device. Examples of the admission control parameters include, but are not limited to, availability of guaranteed time slots.

At step 1030, the association request is acknowledged with a message signal based on the determining. The message can be one of an accept message signal including a device identifier for the OBD in the piconet, and a reject message signal including a reason for refusing the association request.

At step 1035, security procedures are initiated based on the security control field.

A security level in the security control field is represented using one byte bitmap.

Each bit is used to indicate the support of the security features as follows:

Bit 0—Authentication
Bit 1—Integrity protection
Bit 2—Encryption or Decryption
Bit 3—Replay protection using frame counters
Bit 4—Same security for all frames in one session
Bit 5—Key size 192 bits
Bit 6—Key size 256 bits
Bit 7—RFU When no security is needed, the bits in the security control field are set to 0. The default key size used can be set as 128 bit keys. Different levels of security can be implemented for various devices using the one byte bitmap. The coordinator device can fail association, if the security level indicated by the on-body device is not acceptable.

Some capabilities are implemented in the coordinator device and the on-body device for implementation of the security level.

The coordinator device would be preconfigured with following details:

A minimum security mode that the coordinator device expects the on-body device to support.

A security table is stored in non-volatile memory of the coordinator device including the following fields:

Shared keys for each client device (multiple keys identified by an identifier, called Master Key ID (MKID)). The client device in this case can be the OBD.

Device ID, MAC Address, type of device, service provided by the clients. The information can be pre-stored or gathered by an association procedure. This information is retained in the client device even after the client device disassociates from the coordinator device.

The on-body device can also be preconfigured with security keys and the corresponding MKID as in the coordinator device. Device ID, MAC Address, type of device, service provided by the client device are preconfigured in the client device.

The on-body device and the coordinator device should have the capability to store temporal keys and frame counters until the keys are renegotiated in a later session.

A frame counter is used for replay protection. A two byte frame counter can be used. The value of the frame counter from a previous session needs to be saved at the coordinator device and the on-body device. A subsequent session can choose to continue counting from the frame counter stored from the previous session or restart with a new random frame counter.

At step 1040, the OBD is authenticated using a four way handshake procedure that validates that the master key is shared between the coordinator device and the OBD.

At step 1045, a pair-wise key generation to enable encryption and decryption is performed based on the authentication. AES-128 counter mode can be used for data encryption.

At step 1050, the replay protection is implemented.

At step 1055, the integrity protection for data frames is enabled.

AES-128 cipher block chaining-message authentication code (CBC-MAC) can be used for integrity check calculation. The integrity check can be included in the data frames.

A MAC protocol can selectively use privacy and the integrity protection used in the data frames that are sent from the OBD and the coordinator device. A security header field is used to indicate this selection. Standard frames, for example poll or other control frames, sent from the coordinator device need not be encrypted or integrity protected.

At step 1060, data is exchanged between the coordinator device and the on-body device based on the initiation.

At step 1065, the device identifier assigned to the on-body device is dissociated by the coordinator device. The disassociation can be performed by sending a disassociation command signal to the OBD and releasing the device identifier.

The method stops at step 1070.

Figure 13:
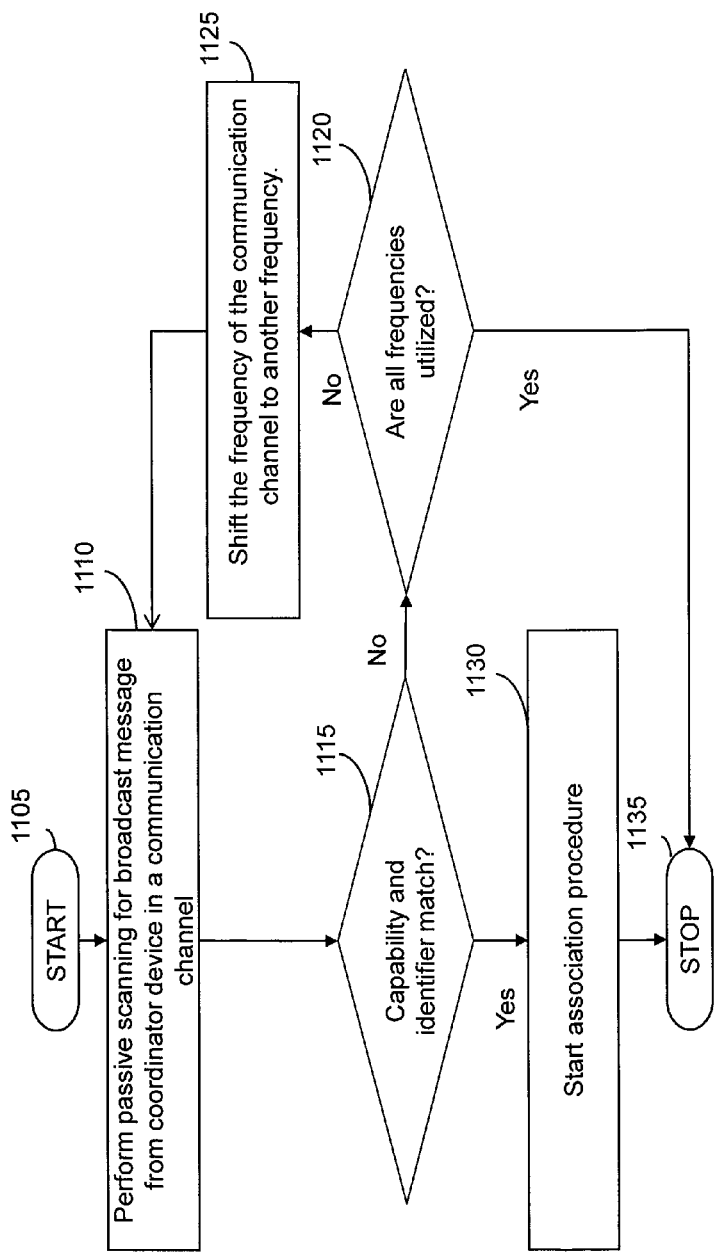
FIG. 13 is a flowchart illustrating a method for discovering a coordinator device by an on-body device, in accordance with one embodiment.

FIG. 13 is a flowchart illustrating a method for discovering a coordinator device by an on-body device, for example the on-body device 115a, in accordance with one embodiment.

The method starts at step 1105.

At step 1110, passive scanning for a broadcast message from the coordinator device is performed.

A list of coordinator devices in a body area network is created based on the broadcasted message from the coordinator device in a communication channel. The broadcast message can include capability and identifier of the coordinator device.

At step 1115, matching capability and identifier for the on-body device is determined.

If the capability and identifier matching is successful then step 1130 is performed else step 1120 is performed.

At step 1120, is determined if all frequencies of the communication channel been utilized for performing passive scanning.

If all frequencies are utilized, then step 1135 is performed else step 1125 is performed.

At step 1125, the frequency of the communication channel is shifted to another frequency.

At step 1130, an association procedure is started with the coordinator device based on the capability and identifier matching determined at step 1115 or step 1125.

The method stops at step 1135.

Figure 14:
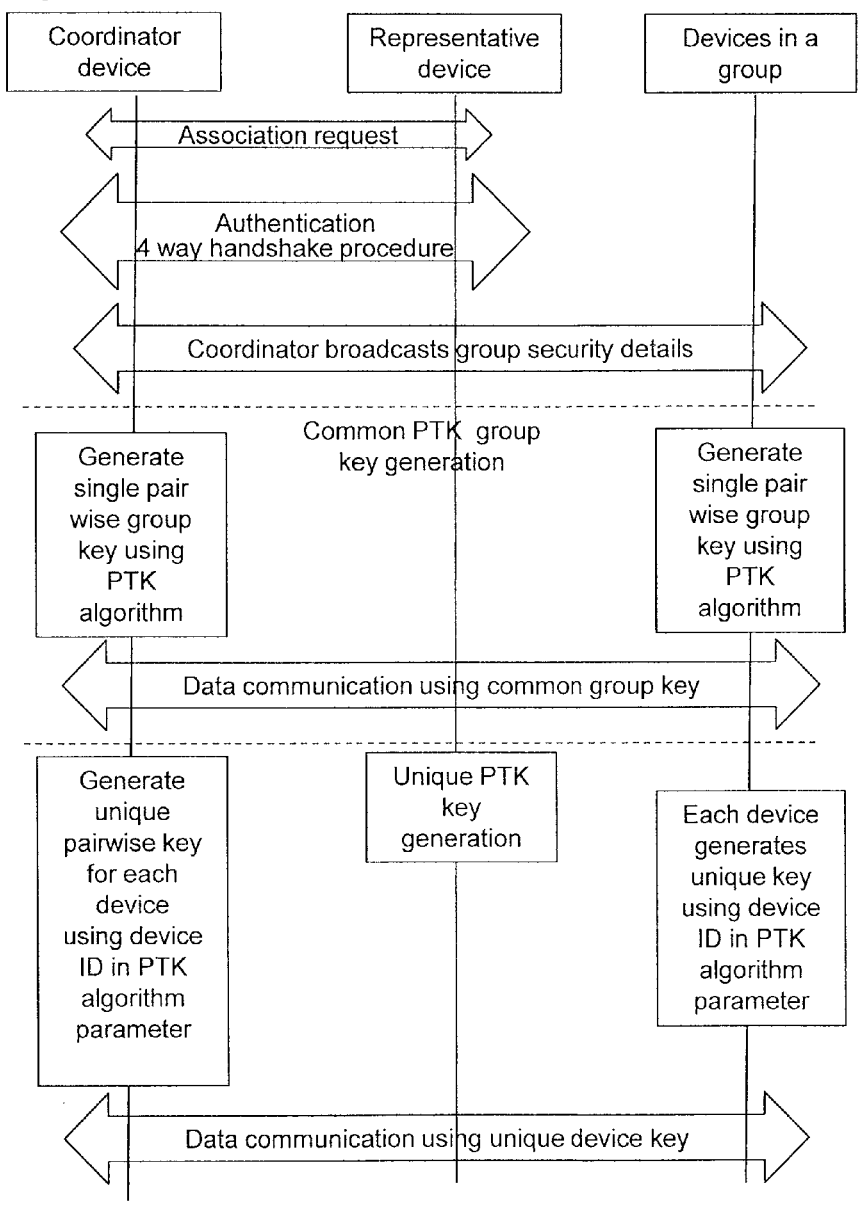
FIG. 14 is a flow diagram illustrating a method for authentication and security key generation between a coordinator device and a group of on-body devices, in accordance with one embodiment.

FIG. 14 is a flow diagram illustrating a method for authentication and security key generation between a coordinator device and a plurality of on-body devices, in accordance with one embodiment.

The coordinator device receives an association request from a representative device that represents the plurality of on-body devices. The plurality of devices can be grouped based on an application and are represented by the representative device. The coordinator device then initiates a four way handshake procedure for authentication. A master key is a shared key that is used to authenticate both the representative device and the coordinator device.

Upon completion of the four way handshake procedure, the coordinator device then broadcasts a message that includes one of a group identifier corresponding to the representative node, a device identifiers for the plurality of on-body devices and a set of security parameters. The set of security parameters include master key ID (MKID) shared between the coordinator device and the plurality of on-body devices, a client nonce, a coordinator nonce, and a flag bit indicating whether a unique individual key or a common key is utilized for communication between the coordinator device and the plurality of on-body devices. The nonce information exchanged during the authentication of the coordinator and representative node and the device identifiers assigned by the coordinator for the group of devices are used by each on-body device to generate a common pair-wise key or a unique pair-wise key that will be used for securing the communication. The device identifiers include individual device identifier for the plurality of on-body devices.

Using the MKID, the Coordinator nonce, client nonce, a common pairwise temporal key (PTK), herein known as group key, is generated by the coordinator device and each on-body device in the plurality of on-body devices. Data communication is secured between the coordinator device and any device in the group of devices using the common group key.

The coordinator device can also generates a pairwise unique key for each on-body device in the group of devices using the device identifier of each on-body device along with the Coord_Nonce, Client Nonce. Similarly, each device in the group of devices generate pairwise unique key using the on-body device ID and the Coord_Nonce, Client Nonce. Data communication is secured between the coordinator device and any group device using unique device key.

Figure 15:
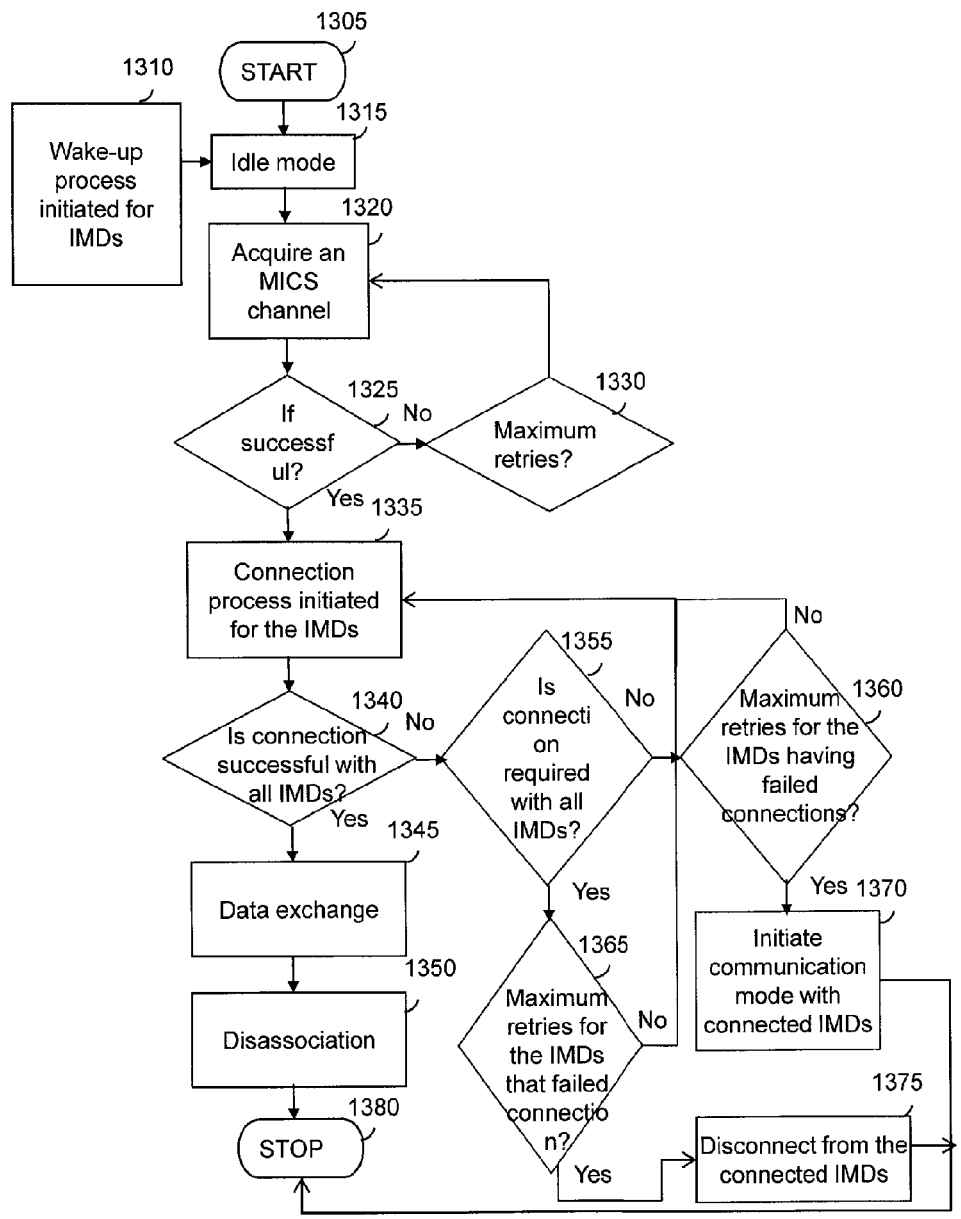
FIG. 15 is a flowchart illustrating a method for communicating with multiple IMDs by a coordinator device, in accordance with one embodiment; and FIG. 16

FIG. 15 is a flowchart illustrating a method for communicating with multiple IMDs by a coordinator device, for example the coordinator device 105, in accordance with one embodiment.

In some cases, it is required to communicate with a plurality of IMDs at one instant of time. Hence a wake-up process needs to be initiated for respective IMDs simultaneously.

The method starts at step 1305.

At step 1310, the wake-up process is initiated for the IMDs. The wake-up process can be programmed in the IMDs or can be performed by an application program.

The IMDs are in an idle mode at step 1315.

At step 1320, an MICS channel is acquired. Successful acquirement of the MICS channel is checked at step 1325.

If the MICS channel is acquired successfully, then step 1335 is performed else a check for maximum retries is performed at step 1330.

At step 1335, a connection process is initiated for each of the IMDs either in sequence or in a batch. The MICS channel can be further acquired by sending a packet, for example a null packet.

At step 1340, successful connection with each of the IMDs is checked. If the connection is not successful with all the IMDs, step 1355 is performed else step 1345 is performed.

At step 1345, data is exchanged between the coordinator device and the IMDs and step 1350 is performed.

At step 1350, the IMD is dissociated by the coordinator device and device identifier is released. The disassociation can be performed by sending a disassociation command signal to the IMD and releasing the device identifier. Step 1380 is performed after step 1350.

In some embodiments, the IMD can disassociate from the coordinator device.

At step 1355, requirement of connection with each IMD is checked.

If only some IMDs need to be connected, step 1360 is performed else step 1365 is performed.

At step 1360, maximum retries for the IMDs that have failed the connection is checked. If the maximum retries are completed then step 1370 is performed else step 1335 is performed.

At step 1365, the maximum retries for the IMDs that have failed the connection is checked. If the maximum retries are completed then step 1375 is performed else step 1335 is performed.

At step 1370, a communication mode is initiated with the connected IMDs and step 1380 is performed.

At step 1375, the coordinator device disconnects from the connected IMDs and step 1380 is performed.

The method stops at step 1380.

FIGS. 16-21 illustrates a group information element (IE) required for enabling group association, in accordance with one embodiment.

Figure 16:
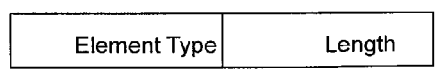

The group IE is an information element for enabling group association request, group association response, Group IE for group information in broadcast message for TDMA based channel access mechanism. As illustrated in FIG. 16, the IE for the said information is identified using an element type field. A length field provides the length of the group IE.

The group association IE has a number of node count fields and group identifiers. In some embodiments, one flag is introduced for indicating the security key identifier that can be one of a unique security key and a group security key.

The group response IE that is sent along with the response for the group association request and in a broadcast message from the coordinator device can include element type, length, and device identifiers. For a Group IE broadcasted by the coordinator device, the group IE includes element type, length, group identifier, device identifiers, and a slot pool information. In some embodiment for Group IE, device identifiers can be replaced by group device bitmap. In another embodiment for the Group IE, device identifiers are not present and device slot allocation is indicated by explicit slot allocation bitmap.

Figure 17:
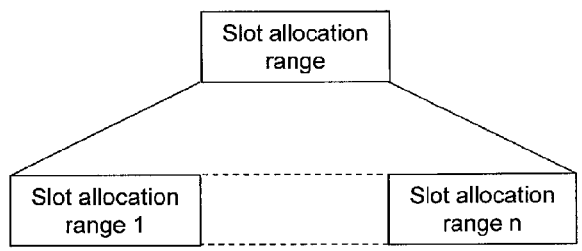

In FIG. 17, range of slot allocation is defined for the devices. In an embodiment, the slot allocation can be continuous based on TDMA. In another embodiment, the slot allocation can be non-continuous based on TDMA.

Figure 18:
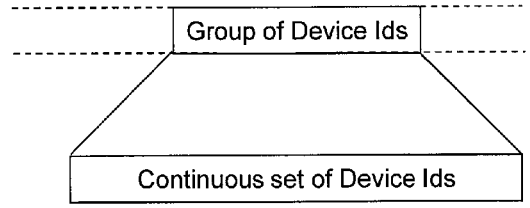

In FIG. 18, group of identifiers are defined as a continuous set of device identifiers.

Figure 19:
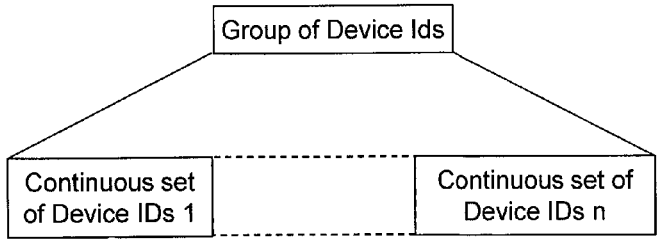

In FIG. 19, group of identifiers allocated by the coordinator device can be non-continuous.

Figure 20:
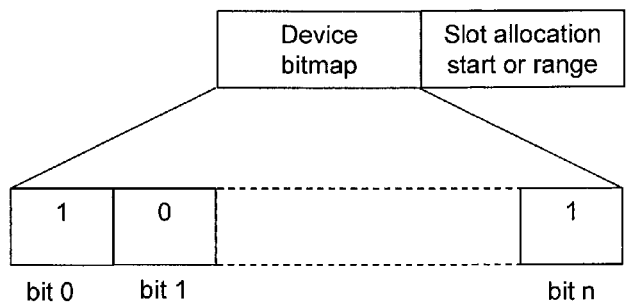

In FIG. 20, a device bitmap is provided that indicates which devices are provided slots by the coordinator device. For example, if a bit 0 in the device bitmap field is enabled then first device in the group of devices is provided the slot. A bit 1 is reset indicates that the second device in the group of devices is not provided slots by the coordinator device.

Figure 21:
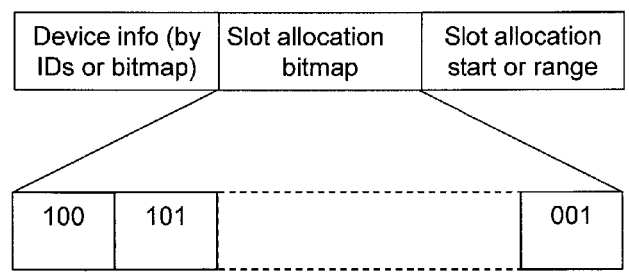

If a device among the group of devices is assigned different number of slots, the device can be defined using the slot allocation bitmap as illustrated in FIG. 21. The slot allocation bitmap includes information for devices that are provided slots in the coordinator device. For example 100 indicates that four slots are provided for the first device. Similarly, the slots are defined for the devices that have been allocated slots by the coordinator device.

Figure 22:
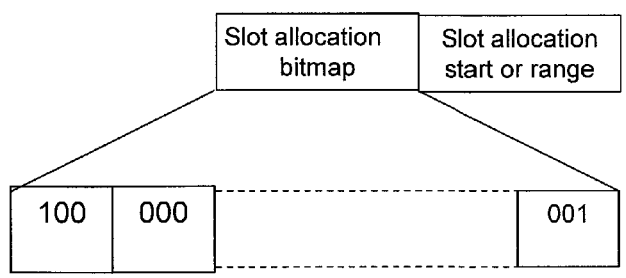
-FIG. 22 illustrates a group information element (IE) required for enabling group association, in accordance with one embodiment.

In some embodiments, the device bitmap and slot allocation bitmap can be represented as single field 'explicit slot allocation bitmap' as illustrated in FIG. 22. In FIG. 22, the first device will have 4 slots defined by 100. The second device can have zero slots defined by 000.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

The invention claimed is:

1. A method for managing a body area network by a coordinator device, the method comprising:
    acquiring a Medical Implant Communication Service (MICS) channel;
    sending a wake-up signal indicative of a wake-up process in a non-MICS channel;
    associating with an implant device receiving the wake-up signal in the MICS channel;
    exchanging data between the coordinator device and the implant device;
    disassociating the implant device by sending a command message for disassociating;
    stopping the exchanging of data between the coordinator device and the implant device upon receiving an emergency signal sent from another implant device; and
    exchanging data between the coordinator device and the another implant device in another MICS channel.

2. The method of claim 1, wherein the wake-up signal includes information associated with the MICS channel.

3. The method of claim 1, wherein associating with the implant device further comprises:
    receiving a first acknowledgement signal based on the sending of the wake-up signal in the MICS channel from the implant device;
    sending a command signal indicative of joining a piconet to the implant device in the MICS channel; and receiving a second acknowledgement signal in the MICS channel based on the sending of the command signal to the implant device.

4. The method of claim 3, wherein the second acknowledgement signal includes a security control field, and
wherein the associating step further comprises:
initiating security procedures based on the security control field;
authenticating the implant device;
performing one of encryption and decryption based on the authenticating;
implementing replay protection; and
enabling integrity protection for data frames.

5. The method of claim 4, wherein the security control field defines a frame level security in a MAC frame using security control application parameter fields exchanged during an association procedure, and
wherein different security features can be selected for each frame according to application and body area network device requirements.

6. The method of claim 4, wherein the security control field defines a frame level security in a MAC frame using security control and application parameters fields exchanged during the association procedure, and
wherein the frame level security is identified during an association procedure with similar frame level security being uniformly used for frames that need security protection.

7. The method of claim 3, wherein sending the wake-up signal comprises
resending the wake-up signal on a non-MICS channel until the first acknowledgement signal is received from the implant device within a defined period of time; and
resending the wake-up signal on another non-MICS channel if no acknowledgement signal is received on the MICS channel within the defined period of time.

8. The method of claim 1, wherein associating with the implant device further comprises:
sending a command signal, indicative of joining a piconet to the implant device in the MICS channel; and
receiving an acknowledgement signal in the MICS channel based on the sending of the command signal, from the implant device.

9. The method of claim 8, wherein the acknowledgement signal includes a security control field, and
wherein the associating step further comprises:
initiating security procedures based on the security control field;
authenticating the implant device;
performing one of encryption and decryption based on the authenticating;
implementing replay protection; and
enabling integrity protection for data frames.

10. The method of claim 1, wherein acquiring the MICS channel comprises:
holding the MICS channel during inactivity between the coordinator device and the implant device.

11. The method of claim 1, further comprising:
scanning the another MICS channel at the coordinator device for the emergency signal sent from the another implant device.

12. The method of claim 1, wherein the coordinator device is pre-configured with a security table comprising device identifiers, master keys and a corresponding master key identifiers, types of devices, services, and media access control addresses.

13. The method of claim 1, further comprising:
acquiring a communication channel;
receiving a request for coordinator device information from an on-body device;
receiving an association request for joining a piconet from the on-body device;
determining the association request based on a plurality of admission control parameters of the coordinator device;
acknowledging the association request based on the determining;
initiating security procedures based on a security control field included in the association request; and
exchanging data between the coordinator device and the on-body device.

14. The method of claim 13, wherein initiating security procedures further comprises:
authenticating the on-body device;
performing one of encryption and decryption based on the authenticating;
implementing replay protection; and
enabling integrity protection for data frames.

15. The method of claim 13, wherein acquiring the communication channel is based on one of a broadcast mode and a non-broadcast mode.

16. The method of claim 13, wherein acquiring the communication channel comprises broadcasting an announcement indicative of occupancy of the communication channel and determining a response based on the announcement.

17. The method of claim 13, wherein the association request comprises one of an average data rate, a packet size, an inter packet arrival time, a size of a packet sent at a MAC layer, a delay requirement, and the security control field.

18. The method of claim 13, wherein the coordinator device is pre-configured with a security table comprising device identifiers, master key identifiers, types of devices, services, and media access control addresses.

19. The method of claim 13, further comprising:
receiving a second association request from each representative node of one or more representative nodes, wherein the one or more representative nodes represents a plurality of on-body devices;
managing the second association request based, wherein the association request from a representative node among the one or more representative nodes is accepted; and
broadcasting a message to the plurality of on-body devices, wherein the message comprises at least one of a group identifier corresponding to the representative node, a device identifier for the plurality of on-body devices and a set of security parameters.

20. The method of claim 19, wherein managing the second association request comprises:
sending a reject message to other representative nodes among the plurality of representative nodes.

21. The method of claim 19, wherein the one or more representative nodes are associated with a single group identifier.

22. The method of claim 19, wherein the one or more representative nodes are associated with separate group identifiers.

23. The method of claim 19, wherein the set of security parameters comprises:
a master key identifier shared between the coordinator device and the plurality of on-body devices;
a coordinator nonce;
a client nonce; and
a flag bit indicating one of a unique individual key and a common key.

24. The method of claim 23, further comprising one of:
generating a unique pair-wise key between the coordinator device and each on-body device using the master key identifier, the coordinator nonce, the client nonce and the device identifier of each on-body device; and
generating a common pair-wise key between the coordinator device and plurality of on-body devices using the master key identifier, the coordinator nonce and the client nonce.

25. The method of claim 24, wherein generating the unique pair-wise key is separately performed by the coordinator device and each on-body device.

26. The method of claim 1, further comprising:
acquiring a communication channel;
broadcasting the coordinator device information; and
receiving an association request for joining a piconet from the on-body device based on the broadcasting.

27. A coordinator device for managing a body area network, the coordinator device comprising:
a communication interface;
a processor for, through the communication interface, acquiring a Medical Implant Communication Service (MICS) channel, sending a wake-up signal indicative of a wake-up process in a non-MICS channel, associating with an implant device receiving the wake-up signal in the MICS channel, exchanging data between the coordinator device and the implant device, and disassociating the implant device by sending a command message for disassociating; and
a storage unit for storing the data,
wherein the processor stops the exchanging of data between the coordinator device and the implant device upon receiving an emergency signal sent from another implant device, and exchanges data between the coordinator device and the another implant device in another MICS channel.

28. The coordinator device of claim 27, wherein the wake-up signal includes information associated with the MICS channel.

29. The coordinator device of claim 28, wherein the processor sends a command signal indicative of joining a piconet to the implant device in the MICS channel and receives an acknowledgement signal in the MICS channel based on the sending of the command signal to the implant device for associating with the implant device.

30. The coordinator device of claim 29, wherein the acknowledgement signal includes a security control field, and
wherein the processor initiates security procedures based on the security control field, authenticates the implant device, performs one of encryption and decryption based on the authenticating, implements replay protection, and enables integrity protection for data frames.

31. The coordinator device of claim 27, wherein the processor receives a first acknowledgement signal from the implant device based on the sending of the wake-up signal in the MICS channel, sends a command signal indicative of joining a piconet to the implant device in the MICS channel; and receives a second acknowledgement signal in the MICS channel based on the sending of the command signal to the implant device for associating with the implant device.

32. The coordinator device of claim 31, wherein the second acknowledgement signal includes a security control field, and
wherein the processor initiates security procedures based on the security control field, authenticates the implant device, performs one of encryption and decryption based on the authenticating, implements replay protection, and enables integrity protection for data frames.

33. The coordinator device of claim 31, wherein the processor performs
resending the wake-up signal on the non-MICS channel until the first acknowledgement signal is received from the implant device within a defined period of time; and
resending the wake-up signal on another non-MICS channel if no acknowledgement signal is received on the MICS channel within the defined period of time.

34. The coordinator device of claim 27, wherein the processor holds the MICS channel during inactivity between the coordinator device and the implant device.

35. The coordinator device of claim 27, wherein the processor, through the communication interface, acquires a communication channel, receives a request for coordinator device information from an on-body device, receives an association request for joining a piconet from the on-body device, determines the association request based on a plurality of admission control parameters defined for the coordinator device, acknowledges the association request based on the determining, initiating security procedures based on a security control field included in the association request, and exchanges data between the coordinator device and the on-body device.

36. The coordinator device of claim 27, wherein the processor authenticates an on-body device, performs one of encryption and decryption based on the authenticating, implements replay protection, and enables integrity protection for data frames.

37. The coordinator device of claim 27, wherein the processor receives an association request from each representative node of one or more representative nodes,
wherein the one or more representative nodes represents a plurality of on-body devices and manages the association request based on the receiving,
wherein the association request from a representative node among the one or more representative nodes is accepted, and broadcasts a message to the plurality of on-body devices, and
wherein the message comprises at least one of a group identifier corresponding to the representative node, a device identifier for the plurality of on-body devices and a set of security parameters.

38. A method for managing a body area network by an implant device, the method comprising:
receiving a wake-up signal indicative of a wake-up process in a non-Medical Implant Communication Service (MICS) channel from a coordinator device;
activating a MICS channel receiver according to the receiving of the wake-up signal;
associating with the coordinator device using information associated with a MICS channel included in the wake-up signal;
exchanging data between the coordinator device and the implant device; and
stopping the exchanging of data between the coordinator device and the implant device when the coordinator device receives a emergency signal sent from another implant device.

39. The method of claim 38, wherein associating with the coordinator device further comprises:
sending a first acknowledgement signal to the coordinator device from the implant device based on the wake-up signal in the MICS channel;
receiving a command signal indicative of joining a piconet in the MICS channel from the coordinator device; and
sending a second acknowledgement signal in the MICS channel based on the command signal to the coordinator device.

40. The method of claim 38, wherein associating with the coordinator device further comprises:

receiving a command signal indicative of joining a piconet in the MICS channel from the coordinator device; and sending an acknowledgement signal in the MICS channel based on the command signal to the coordinator device.

\* \* \* \* \*